(12) United States Patent
Miller et al.

(10) Patent No.: US 8,421,270 B1
(45) Date of Patent: Apr. 16, 2013

(54) SYSTEM AND METHOD FOR A CONTROLLED INTERCONNECTED DC AND AC BUS MICROGRID

(75) Inventors: Landon Cabell Garland Miller, Tuscaloosa, AL (US); David Michael Barrett, Burtonsville, MD (US)

(73) Assignee: Science Applications International Corporation, McLean, VA (US)

( * ) Notice: Subject to any disclaimer, the term of this patent is extended or adjusted under 35 U.S.C. 154(b) by 490 days.

(21) Appl. No.: 12/760,647

(22) Filed: Apr. 15, 2010

(51) Int. Cl.
*H02J 7/00* (2006.01)

(52) U.S. Cl.
USPC ............................................ 307/65; 307/45

(58) Field of Classification Search ............... 307/65, 307/45
See application file for complete search history.

(56) References Cited

U.S. PATENT DOCUMENTS

| | | | |
|---|---|---|---|
| 5,804,953 A | 9/1998 | Bowyer | |
| 6,603,672 B1 | 8/2003 | Deng | |
| 6,693,409 B2 | 2/2004 | Lynch et al. | 323/208 |
| 6,724,644 B2 | 4/2004 | Loef | 363/89 |
| 6,765,370 B2 | 7/2004 | Bradley | 323/222 |
| 6,778,414 B2 | 8/2004 | Chang et al. | 363/67 |
| 6,819,087 B2 | 11/2004 | Delmerico et al. | 322/58 |
| 7,057,376 B2 | 6/2006 | Cook et al. | 323/207 |
| 7,116,010 B2 | 10/2006 | Lasseter | |
| 7,117,044 B2 * | 10/2006 | Kocher et al. | 700/34 |
| 7,652,393 B2 | 1/2010 | Moth | 307/64 |
| 7,786,616 B2 | 8/2010 | Naden et al. | 307/64 |
| 7,978,445 B2 | 7/2011 | Ritter | 361/18 |
| 8,067,855 B2 | 11/2011 | Mumtaz et al. | 307/45 |
| 8,183,714 B2 * | 5/2012 | McDonnell | 307/82 |
| 2002/0036430 A1 | 3/2002 | Welches | |
| 2002/0135492 A1 | 9/2002 | Reagan et al. | 340/3.9 |
| 2004/0061380 A1 | 4/2004 | Hann | |
| 2004/0124711 A1 | 7/2004 | Muchow | |
| 2005/0105306 A1 | 5/2005 | Deng | |
| 2007/0273211 A1 * | 11/2007 | Wang et al. | 307/45 |
| 2008/0143304 A1 | 6/2008 | Bose et al. | 323/205 |
| 2011/0026282 A1 | 2/2011 | Chapman et al. | 363/65 |

OTHER PUBLICATIONS

"Characterization of Microgrids in the United States," Final Whitepaper by Resource Dynamics Corporation (Jan. 2005).

\* cited by examiner

*Primary Examiner* — Robert L. Deberadinis
(74) *Attorney, Agent, or Firm* — King & Spalding LLP (57) ABSTRACT

Systems and methods are described herein for a microgrid module. The microgrid module can receive power from either AC or DC sources and output either AC or DC power as needed. The microgrid module includes transformers and/or power converters necessary for modifying the input AC or DC power sources to meet the required characteristics of the output power. The microgrid module further comprises a control software module installed on a microgrid computer. The control software module receives information from sensors installed in the microgrid module and sends commands to controllable elements installed in the microgrid module for the purpose of controlling the power through the microgrid in a manner consistent with power requirements of various loads and the power available from multiple and diverse sources and internal and/or external energy storage devices.

18 Claims, 10 Drawing Sheets

SYSTEM AND METHOD FOR A CONTROLLED INTERCONNECTED DC AND AC BUS MICROGRID

CROSS-REFERENCE TO RELATED APPLICATIONS

The present application incorporates by reference in their entirety the following co-owned U.S. patent application Ser. No. 12/760,631 System and Method for Routing Power Across Multiple Microgrids Having DC and AC Buses, and Ser. No. 12/760,654 System and Method for Management of a DC and AC Bus Microgrid, both of which are being filed concurrently with this application.

BACKGROUND OF THE INVENTION

1. Field of Invention

The present invention relates generally to microgrids for controlling small distributed energy resources (DERs). More specifically, the present invention relates to a self-managed microgrid with DC and AC inputs and outputs.

2. Description of Related Art

In general, microgrids are electric networks that are capable of deriving power from a number of sources including the conventional power grid, localized power generating capabilities and alternative power sources such as solar arrays and wind turbines. The microgrid can aggregate power from a number of sources, converting the different formats of power derived from multiple and diverse sources to common voltage and frequency formats that can be subsequently distributed to one or a number of loads. In addition, the microgrid can maintain the reliability of power to one or a number of loads in the face of changing power levels that are derived from the multiple and diverse sources. A microgrid can be coordinated to provide power from a variety of power sources and to provide power with greater reliability. For example, a microgrid can provide an alternate source of power to a site when there is an interruption in the power delivered by the conventional utility power grid. The power that the microgrid supplies to a site may be derived from a variety of sources including energy storage devices, alternative energy sources such wind or solar power, or from burning conventional fossil fuels. A description of prior art microgrid configurations is found in the whitepaper entitled "Characterization of Microgrids in the United States" prepared for Sandia National Laboratories by Resource Dynamics Corporation dated January 2005 and incorporated herein by reference in its entirety.

In general, there are prior patents and published patent applications directed to various aspects of microgrids. For example, U.S. Pat. No. 7,116,010 relates to the control of small distributed energy resources. U.S. Pat. No. 6,603,672 discloses a power converter system which allows various types of power formats to be derived from a variety of sources and converted in a predetermined manner to supplement power for a localized grid. U.S. Pat. No. 5,804,953 discloses a power converter for converting AC shore power for shipboard use, which converts a variety of shore voltages for shipboard use. U.S. Patent Application No. 2005/0105306 discloses a power converter that is adaptable for interfacing a variety of power sources with a three-phase AC power grid. U.S. Patent Application No. 2004/0124711 discloses a mobile power system housed in a standard freight container; the system distributes power in a plurality of configurations such as different voltage. U.S. Patent Application No. 2004/0061380 discloses a power management system for variable load applications. U.S. Patent Application No. 2002/0036430 discloses a local area grid for distributed power.

The disclosures in these prior patents and published patent applications is hereby incorporated herein by reference in their entirety. However, as described further below, none of these prior patents or published patent applications provides the solutions of the invention described and claimed in this application.

SUMMARY OF THE INVENTION

Summary of the Problem

The present state of the art for microgrid technology has several deficiencies, including the lack of any standardized bus architecture within such a microgrid for the management of AC to AC, DC to DC, AC to DC, and DC to AC across multiple inputs and outputs. Also needed is a method for controlling the physical circuitry within a microgrid using intelligent sensors and controllers for the management of AC to AC, DC to DC, AC to DC, and DC to AC across multiple inputs and outputs. There is a further need to be able to dynamically manage bi-directional electrical flows to and from external AC and DC sources, and to and from storage, and to and from an inter-grid bus interface controller for multi-microgrid output and inputs using a control system which both senses and effectuates appropriate microgrid circuitry controls. Static devices generally are not capable of dealing with the variety and complexities imposed by wide ranging sources of power and loads using such power. Finally, there is a further need to be able to rapidly control the physical circuitry within a microgrid based upon sensing interruptions in a power supply and to switch to alternate power supplies. Thus there is a need for advances in the art of electrical micro-grids and their management that addresses these deficiencies. Such deficiencies are overcome by the present invention, as is further detailed below.

Summary of the Solution

The present invention addresses the foregoing limitations in the existing art by providing a microgrid that can manage AC to AC, DC to DC, AC to DC, and DC to AC across multiple inputs and outputs. The present invention uses sensors in the physical circuitry layer to communicate with a control software layer that manages the flow of power to and from the microgrid. The control software layer receives data concerning the operation of the physical circuitry layer and sends commands to controllable elements in the physical circuitry layer to control the operation of the microgrid module. The controllable elements also can include software and processing capabilities for executing instructions.

In a first exemplary embodiment, the invention comprises a microgrid module capable of receiving both AC power and DC power and capable of supplying both AC power and DC power to a load. The microgrid module can comprise an AC grid input bus for receiving AC power from the conventional utility grid. The microgrid module also comprises an AC output bus for supplying AC power to a load. The AC output bus can receive power from the AC grid input or from a DC bus. A converter converts DC power to AC power for transmission on the AC output bus. The DC bus can receive power from a variety of power sources including conventional power sources, renewable power sources and energy storage devices. The DC bus can supply DC power to a load or energy storage device. The DC bus can receive power from the various previously identified sources or via a converter from the AC grid input bus. The AC input bus also can be coupled to transformers as needed to modify voltage. The microgrid module further comprises a control software module for controlling the flow of power to and from the microgrid module via one or more sensors and controllers.

In another exemplary embodiment, the invention comprises a method for controlling the power supplied to and from a microgrid module. The exemplary method comprises a first energy resource, such as a generator coupled to a wind turbine, providing DC power to the microgrid module via a DC bus. A sensor coupled to the DC bus can detect an interruption in the DC power supplied from the first energy resource and can notify a control software module of the interruption. The control software module can send a command to a controller coupled to an AC grid input bus to initiate power delivery to the microgrid module from the conventional AC power grid. A converter coupled to the AC grid input bus can convert the AC power to DC power for delivery via the DC bus to a load.

In yet another exemplary embodiment, the invention comprises a method for controlling power supplied to and from a microgrid module. The exemplary method comprises an energy resource, such as a photovoltaic source, providing DC power to a microgrid module via a DC bus. A sensor coupled to the DC bus can detect an interruption in the DC power provided by the energy resource and can notify a control software module of the interruption. The control software module can send a command to a controller to initiate power delivery from an energy storage device, such as an array of batteries, coupled to the microgrid module. A DC bus can receive power from the energy storage device and a converter can convert the DC power to AC power for delivery via an AC output bus to an AC load.

These and other exemplary embodiments of the invention will be described in greater detail in the following text and in the associated figures.

DETAILED DESCRIPTION

The present invention comprises a portable microgrid module that is fully integrated and can manage both AC and DC inputs and AC and DC outputs. The microgrid module includes sensors, controllers, transformers, and a control software module. The microgrid module also can include or be coupled to energy storage devices such as batteries and capacitors. As described in further detail in related patent applications filed herewith, the microgrid also has the capability of being coupled to one or more other microgrid modules. The integrated control of the connection of multiple DC and AC buses within the microgrid allows for deterministic real-time control over bi-directional power sources from intermittent and continuous renewable and conventional power sources. Real-time control over the distributed power sources supplying the microgrid allows the microgrid to respond to interruptions in one power supply and to transition to another power supply.

The microgrid module of the present invention can accept alternative, renewable, and conventional power inputs into both DC and AC buses and distributes or converts them as appropriate to match standardized bus values across the input, load, macrogrid, and microgrid to microgrid buses. The microgrid can provide power conversion from DC to DC, AC to AC, AC to DC and DC to AC between the buses under dynamic local control. The microgrid of the present invention also has the capacity to store electrical energy or energy in a form transmutable into electrical energy, such as in a chemical form, for later distribution.

Each microgrid module can comprise various sub-systems and devices that include, but are not limited to, quick-connect/quick-disconnect bus bars and plates, step-up and step-down transformers, patch or inter-connection panels and intelligent breakers and sensors, batteries, ultra-capacitors, flywheels, and other temporary or permanent energy storage devices and systems and their control electronics. The microgrid module can also include power converters, circuitry to accommodate phase imbalance by providing the appropriate neutral connections, and various physical wiring and physical mounting capabilities to provide for adequate stabilization and insulation of the various components in the modular microgrid system.

The microgrid also comprises a control software module that can interface with a management software module. The operation of the management software module is described in greater detail in the related applications filed concurrently with this application.

Turning to the figures, in which like numerals indicate like elements throughout the figures, exemplary embodiments of the present invention are illustrated and will be described in the following text. Those of skill in the art will appreciate that the following are merely non-limiting preferred embodiments and alternate embodiments can be implemented in accordance with the invention.

Figure 1:
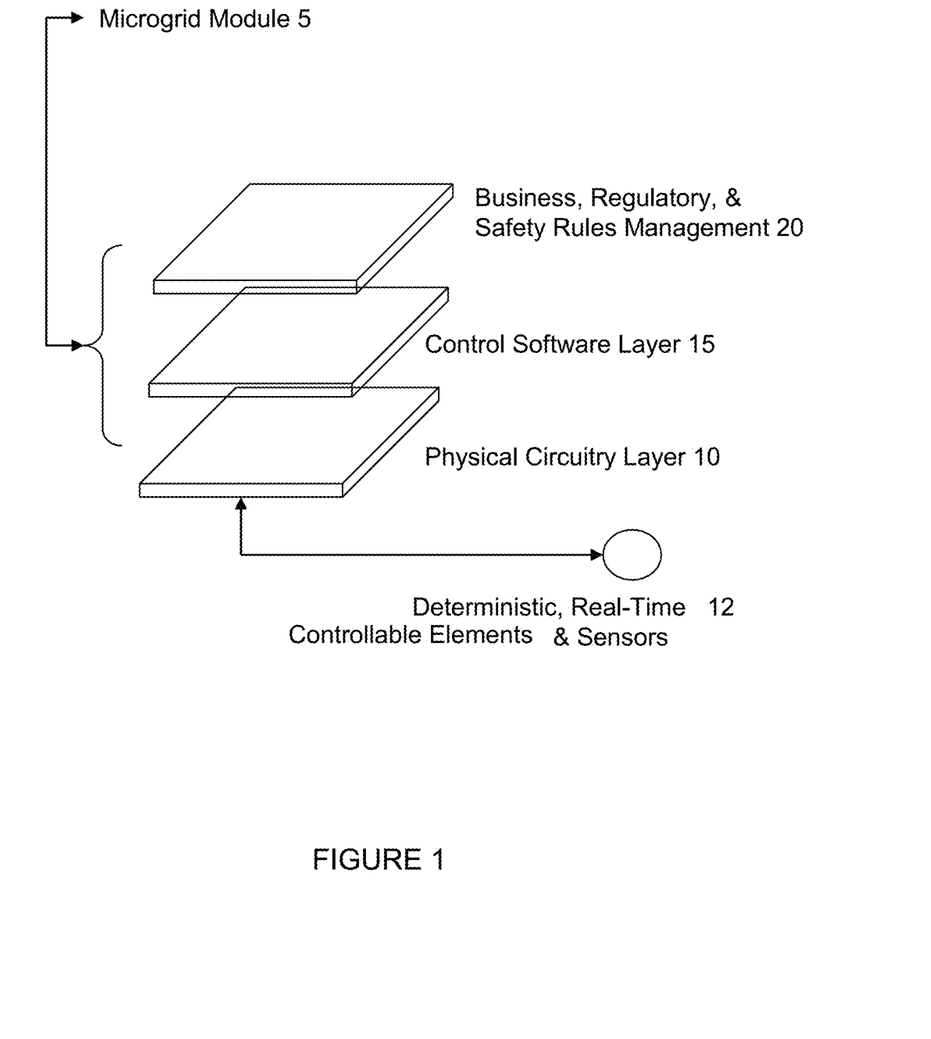
FIG. 1 is a diagram illustrating an overview of components in accordance with an exemplary embodiment of the invention.

Referring to FIG. 1, an exemplary microgrid architecture can be depicted in three layers. The first layer is the physical circuitry layer 10. The physical circuitry layer comprises the AC and DC input and output buses, the sensors and controllable elements that monitor and control the flow of power into and out of the microgrid module, and other conventional electrical components such as converters and transformers. The sensors and controllable elements that monitor and control the microgrid module can vary from simple sensors and switches to more complex "intelligent" sensors and switches that can include their own software and processing capabilities. Exemplary, non-limiting embodiments of the physical circuitry layer 10 are depicted in greater detail in FIG. 3 and FIGS. 4A-4D.

The intermediate layer of the architecture for the microgrid is the control software layer 15 and the final layer is the rules management layer 20 which includes business, regulatory and safety rules. The control software layer 15 is typically installed on a local computing device and can be implemented in, for example, active message queuing/message broker software as is known to those of ordinary skill in the art. While the control software layer is typically installed on a local computing device that is part of the microgrid module, those of ordinary skill in the field will understand that software modules controlling the microgrid module or its components can be installed in components of the physical circuit layer or in other computing devices coupled to the microgrid module. The rules management layer 20 also is typically installed on a local computing device and can be implemented in, for example, a virtual machine with a service oriented architecture and use SOAP (Simple Object Access Protocol) as a messaging protocol.

Figure 2:
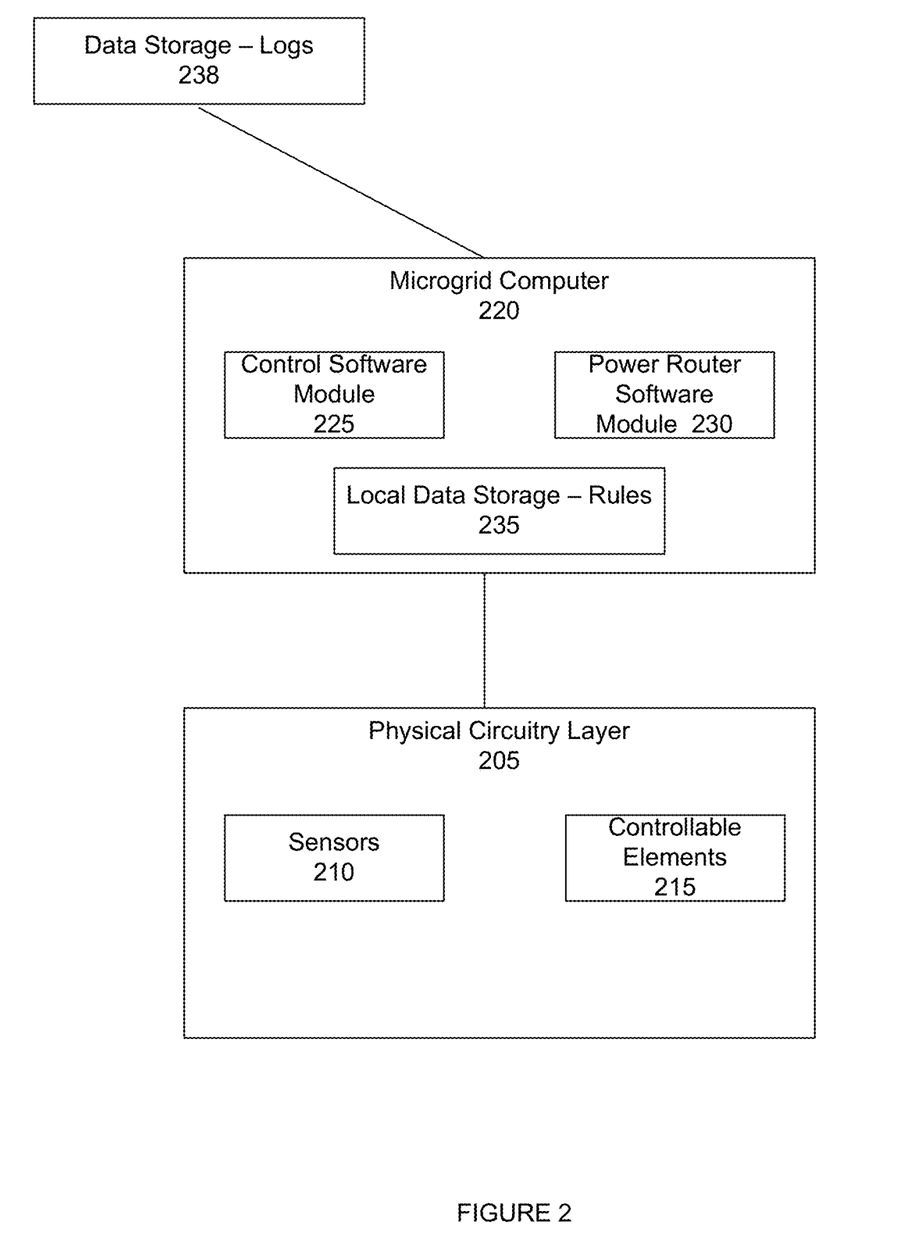
FIG. 2 is a diagram illustrating an overview of components in accordance with an exemplary embodiment of the invention.

Referring to FIG. 2, another exemplary architecture diagram illustrates in further detail the components of the physical circuitry layer 10 and the control software layer 15. FIG. 2 shows the physical circuit layer 205 comprising sensors 210 and controllable elements 215. The sensors 210 can collect data from the AC and DC buses (not shown in FIG. 2) and deliver the collected data to the microgrid computer 220. The sensors 210 can detect a variety of power conditions including direction, voltage, current and power levels, and associated changes and the rate of change of these parameters. For example, the sensors can provide data indicating a demand for power, data indicating the flow of power within the microgrid module, and data indicating an interruption in the flow of power to the microgrid module. The controllable elements 215 can include switches, power converters and other intelligent electrical devices to control the flow of power to and from the microgrid module. Intelligent electrical devices typically include their own software and processing capabilities. The controllable elements 215 can receive commands from the control software module 225 of the microgrid computer 220. In certain embodiments, intelligent controllable elements can perform control functions without communicating with a separate microgrid computer.

The microgrid computer 220 provides a single or multiple user interface to the various controllable microgrid elements. The microgrid computer 220 communicates with the sensors 210 and controllable elements 215 of the physical circuit layer. The microgrid computer 220 comprises installed control software module 225 that processes data received from the sensors 210 and that transmits commands to the controllable elements 215. The microgrid computer 220 can also comprise power router software module 230 that controls the flow of power to and from the microgrid module and other microgrid modules. For example, in certain embodiments multiple microgrid modules can be coupled in various arrangements.

The microgrid computer 220 can also comprise local data storage 235 and can be coupled to remote data storage 238. In the preferred embodiment, the local data storage 235 stores rules used by the control software module 225 to control the controllable elements 215. Locally storing the rules assists the control software module 225 to respond in real time to changes in power supplied to the microgrid module. For example, the rules can define when the microgrid module will draw power from a power storage device or from the conventional utility grid. More generally, the rules can control various operating modes for the microgrid module including islanding, peak shaving, power conditioning, aggregate load reduction, and the sale of power back to a utility. The remote storage device 238 can store log data about the operation of the microgrid module that can be used for further planning and operation of the microgrid module. In alternate embodiments of the invention, software modules and data storage devices can be located either locally or remotely in different arrangements of computing environments.

Although the exemplary embodiments herein are generally described in the context of software modules running on a computing device local to the physical circuitry layer as in FIG. 2, those skilled in the art will recognize that the present invention also can be implemented in conjunction with other program modules in other types of computing environments. Furthermore, those skilled in the art will recognize that the present invention may be implemented in a stand-alone or in a distributed computing environment. In a distributed computing environment, program modules may be physically located in different local and remote memory storage devices. Execution of the program modules may occur locally in a stand-alone manner or remotely in a client/server manner. Examples of such distributed computing environments include local area networks of an office, enterprise-wide computer networks, and the global Internet.

The detailed description of the exemplary embodiments includes processes and symbolic representations of operations by conventional computer components, including processing units, memory storage devices, display devices and input devices. These processes and symbolic representations are the means used by those skilled in the art of computer programming and computer construction to most effectively convey teachings and discoveries to others skilled in the art. These processes and operations may utilize conventional computer components in a distributed computing environment, including remote file servers, remote computer servers, and remote memory storage devices. Each of these conventional distributed computing components is accessible by a processing unit via a communications network.

The present invention includes computer hardware and software which embody the functions described herein and illustrated in the appended flow charts. However, it should be apparent that there could be many different ways of implementing the invention in computer programming, and the invention should not be construed as limited to any one set of computer program instructions. Further, a skilled programmer would be able to write such a computer program to implement the disclosed invention without difficulty based on the flow charts and associated description in the application text, for example. Therefore, disclosure of a particular set of program code instructions is not considered necessary for an adequate understanding of how to make and use the invention. The inventive functionality of the claimed computer hardware and software will be explained in more detail in the following description in conjunction with the other figures in the application.

Figure 2A:
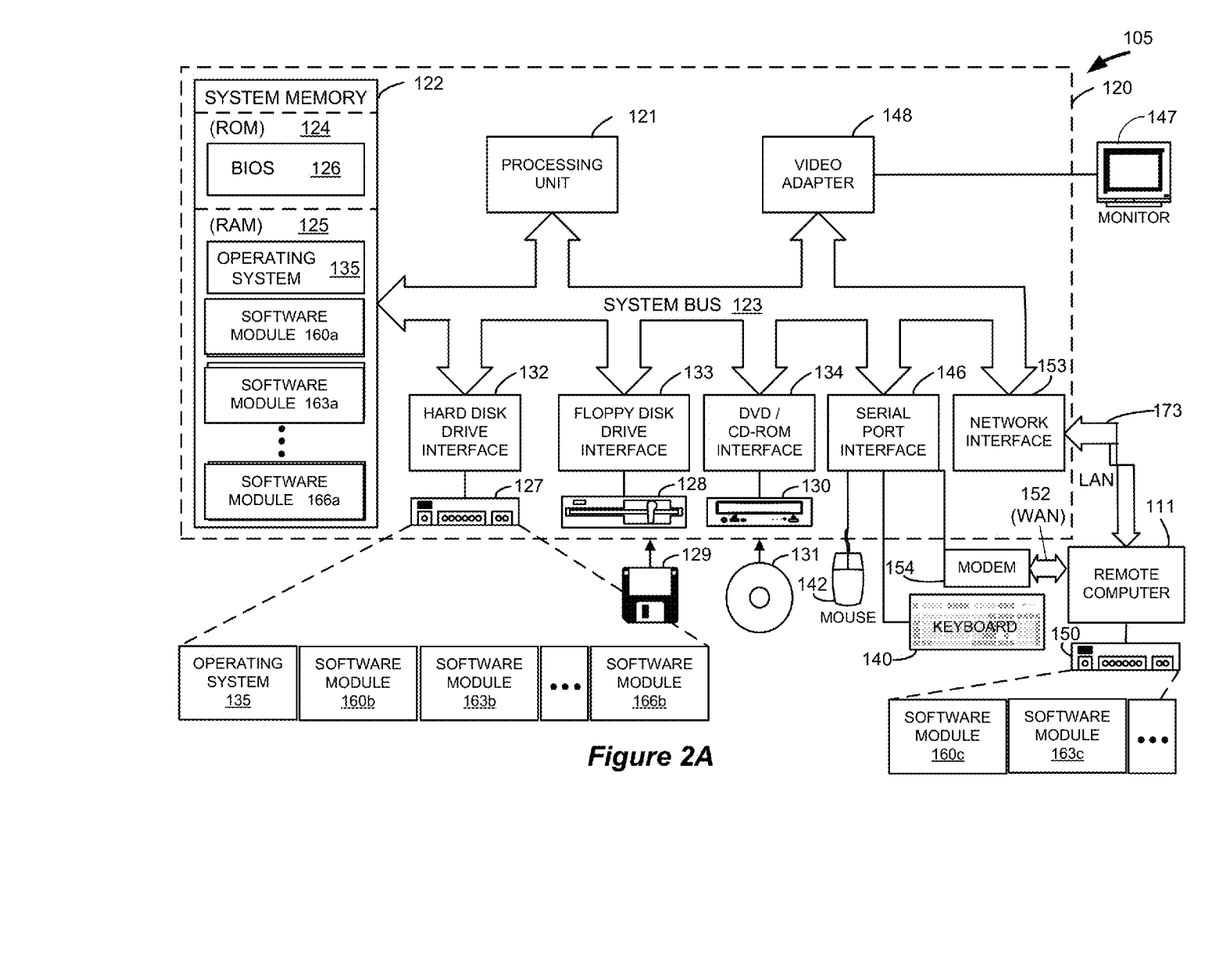
FIG. 2A is a diagram illustrating the components of a computing device in accordance with an exemplary embodiment of the invention.

Referring now to FIG. 2A, aspects of an exemplary computing environment in which the present invention can operate are illustrated. Those skilled in the art will appreciate that FIG. 2A and the associated discussion are intended to provide a brief, general description of the preferred computer hardware and program modules, and that additional information is readily available in the appropriate programming manuals, user's guides, and similar publications.

FIG. 2A illustrates a conventional computing device 120 suitable for supporting the operation of the preferred embodiment of the present invention such as the microgrid computer. As illustrated previously in FIG. 2, the microgrid computer 220 typically comprises multiple software modules. While not required for the computing device implemented in a microgrid module, the computing device 120 illustrated in FIG. 2A operates in a networked environment with logical connections to one or more remote computers 111. The logical connections between computing device 120 and remote computer 111 are represented by a local area network 173 and a wide area network 152. Those of ordinary skill in the art will recognize that in this client/server configuration, the remote computer 111 may function as a file server or computer server.

The computing device 120 includes a processing unit 121, such as "PENTIUM" microprocessors manufactured by Intel Corporation of Santa Clara, Calif. The computing device 120 also includes system memory 122, including read only memory (ROM) 124 and random access memory (RAM) 125, which is connected to the processor 121 by a system bus 123. The preferred computing device 120 utilizes a BIOS 126, which is stored in ROM 124. Those skilled in the art will recognize that the BIOS 126 is a set of basic routines that helps to transfer information between elements within the computing device 120. Those skilled in the art will also appreciate that the present invention may be implemented on computers having other architectures, such as computers that do not use a BIOS, and those that utilize other microprocessors.

Within the computing device 120, a local hard disk drive 127 is connected to the system bus 123 via a hard disk drive interface 132. A floppy disk drive 128, which is used to read or write a floppy disk 129, is connected to the system bus 123 via a floppy disk drive interface 133. A CD-ROM or DVD drive 130, which is used to read a CD-ROM or DVD disk 131, is connected to the system bus 123 via a CD-ROM or DVD interface 134. A user enters commands and information into the computing device 120 by using input devices, such as a keyboard 140 and/or pointing device, such as a mouse 142, which are connected to the system bus 123 via a serial port interface 146. Other types of pointing devices (not shown in FIG. 2A) include track pads, track balls, pens, head trackers, data gloves and other devices suitable for positioning a cursor on a computer monitor 147. The monitor 147 or other kind of display device is connected to the system bus 123 via a video adapter 148.

The remote computer 111 in this networked environment is connected to a remote memory storage device 150. This remote memory storage device 150 is typically a large capacity device such as a hard disk drive, CD-ROM or DVD drive, magneto-optical drive or the like. Those skilled in the art will understand that software modules are provided to the remote computer 111 via computer-readable media. The computing device 120 is connected to the remote computer by a network interface 153, which is used to communicate over the local area network 173.

In an alternative embodiment, the computing device 120 is also connected to the remote computer 111 by a modem 154, which is used to communicate over the wide area network 152, such as the Internet. The modem 154 is connected to the system bus 123 via the serial port interface 146. The modem 154 also can be connected to the public switched telephone network (PSTN) or community antenna television (CATV) network. Although illustrated in FIG. 2A as external to the computing device 120, those of ordinary skill in the art can recognize that the modem 154 may also be internal to the computing device 120, thus communicating directly via the system bus 123. Connection to the remote computer 111 via both the local area network 173 and the wide area network 152 is not required, but merely illustrates alternative methods of providing a communication path between the computing device 120 and the remote computer 111.

Although other internal components of the computing device 120 are not shown, those of ordinary skill in the art will appreciate that such components and the interconnection between them are well known. Accordingly, additional details concerning the internal construction of the computing device 120 need not be disclosed in connection with the present invention.

Those skilled in the art will understand that program modules, such as an operating system 135 and other software modules 160a, 163a and 166a, and data are provided to the computing device 120 via computer-readable media. In the preferred computing device, the computer-readable media include the local or remote memory storage devices, which may include the local hard disk drive 132, floppy disk 129, CD-ROM or DVD 131, RAM 125, ROM 124, and the remote memory storage device 150.

Figure 3:
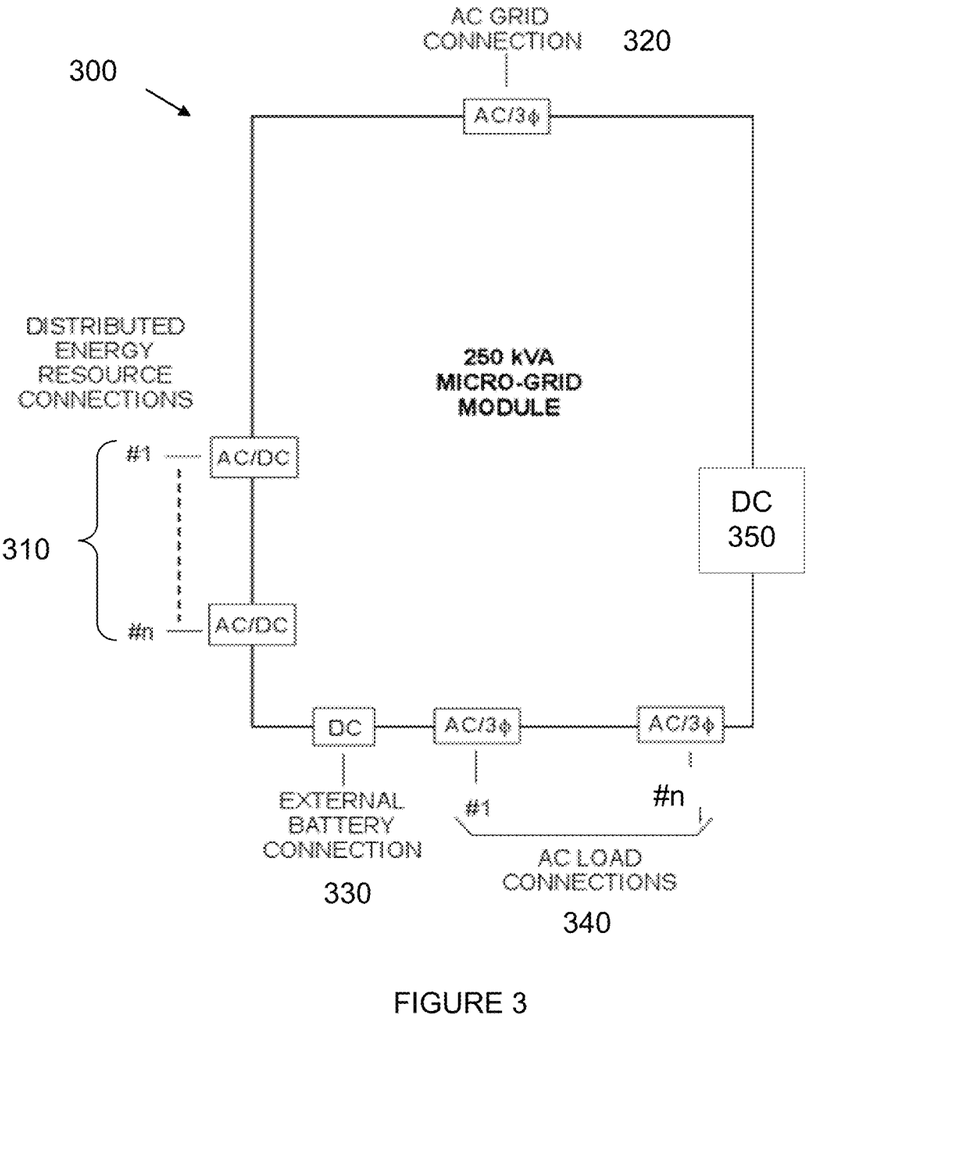
FIG. 3 is a diagram illustrating an overview of the components of the physical circuit layer in accordance with an exemplary embodiment of the present invention.

Referring to FIG. 3, an exemplary microgrid module 300 is shown. As illustrated, the microgrid module 300 may operate from a variety of power sources, including a connection to the local utility grid 320 and one or more distributed energy resources ("DERs") 310 such as internal combustion engine/generator sets, microturbine generators, fuel cells, wind turbines, and photovoltaic arrays. In addition, the microgrid network may have to level the power demands of various loads against the available power sources using energy storage assets 330 which may include batteries (as shown), flywheels, electrochemical capacitors and/or superconducting magnetic energy storage components (SMES).

Although the microgrid module 300 is labeled as a 250 kVA module, that value is merely an example and other microgrid modules within the scope of this invention can be designed to handle smaller or larger amounts of power. The microgrid module may have to provide power to several load systems with a variety of power format requirements including 208 V-3phase, 480 V-3 phase, 120 V-single phase, 48 VDC, and 300 VDC as examples. As illustrated in FIG. 3, the microgrid module 300 includes one or more AC output buses that supplies power to one or more AC loads 340. Exemplary microgrid module 300 also includes a DC output bus 350 supplying power to a DC load. Processing power to flow from various sources to various load and energy storage assets and from energy storage assets to the loads requires the use of power conversion to interface various incoming and outgoing power formats.

The exemplary embodiments set forth in FIGS. 4A-4D illustrate in greater detail the components of the microgrid module 300 shown in FIG. 3. FIGS. 4A-4D are broken up into four more detailed components of the overview shown in FIG. 3. Those of skill in the art will recognize that the embodiments shown in FIGS. 4A-4D may be modified by adding, removing, or rearranging conventional electrical components without departing from the scope of the invention.

Figure 4A:
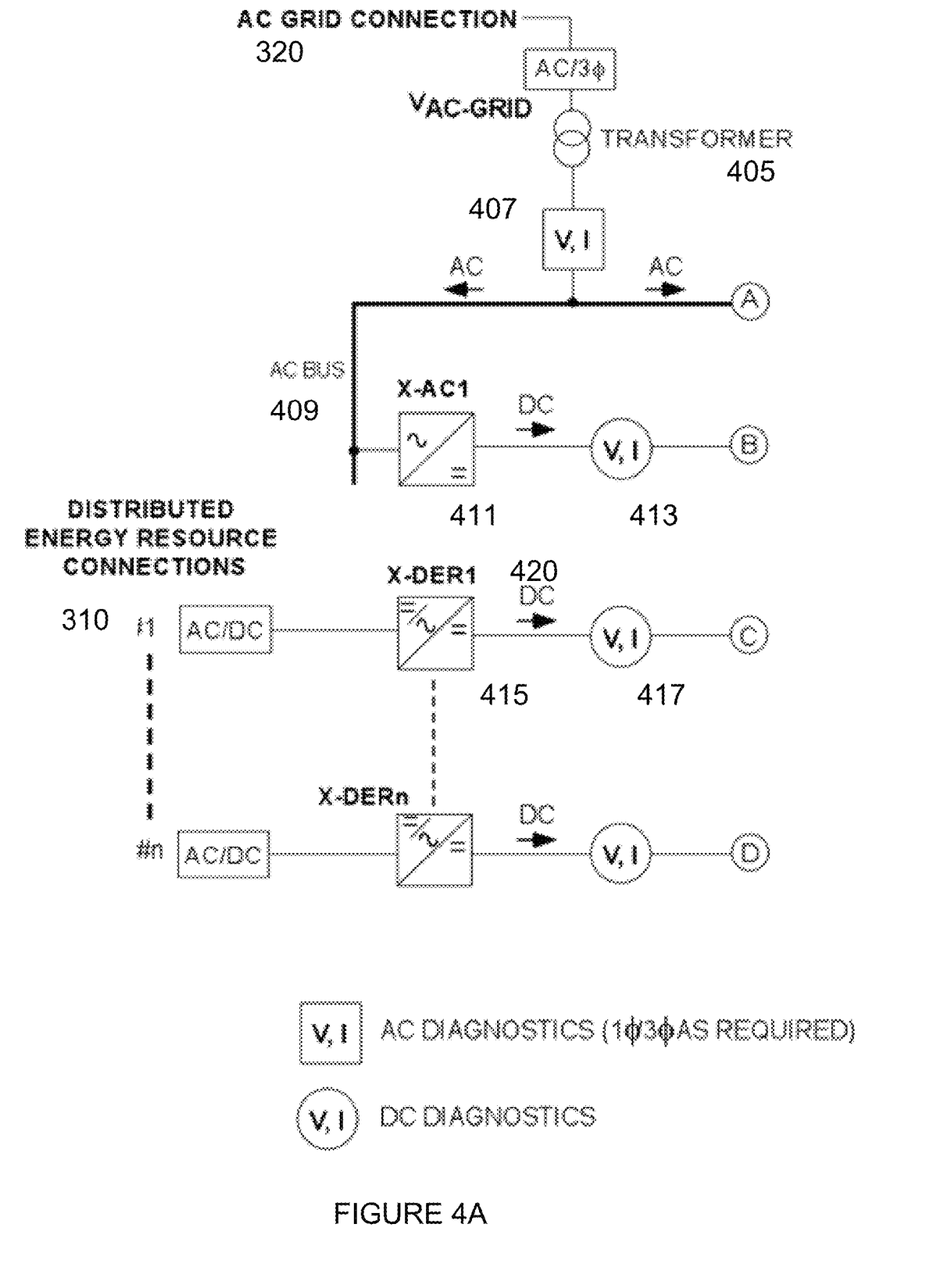
FIGS. 4A, 4B, 4C, and 4D are diagrams illustrating portions of the components of the physical circuit layer in accordance with an exemplary embodiment of the present invention.

Turning to FIG. 4A, DERs 310 are illustrated as connected to DC input bus 420. As illustrated in FIG. 4A, the microgrid module may comprise one or more DC input buses 420 and may be coupled to one or more DERs 310. As explained previously, the DERs 310 can be one or more of a variety of energy sources, including conventional and renewable energy sources. If the DER 310 is an AC power source, a converter 415 can be used to convert the AC power to DC power for transmission onto the DC input bus 420. The DC input bus 420 can also be coupled to a DC diagnostic element 417. The DC diagnostic element 417 can comprise one or more sensors that can communicate via software with the control software module 225.

FIG. 4A also illustrates an exemplary AC grid connection 320 that connects to the AC grid input bus 409 of the microgrid module. The connection with the AC grid allows power from the conventional utility grid to be fed to the microgrid module. In certain embodiments a transformer 405 will be necessary to adjust the voltage of the power flowing from the utility grid to the microgrid module. An AC diagnostic module 407 can also be located at the AC grid connection 320. The AC diagnostic module can comprise one or more sensors in communication with the control software module 225. The AC diagnostic module 407 can provide data to the control software module 225 about the flow of power from the utility grid to the microgrid module and the control software module 225 can control the power flow at this connection with one or more controllable elements in the physical circuitry layer. The AC grid input bus can also be coupled to converter 411 for converting AC power to DC power that flows to the DC input bus 420. The DC input bus receiving power from the AC grid input bus 409 can also comprise another DC diagnostic element 413.

Figure 4B:
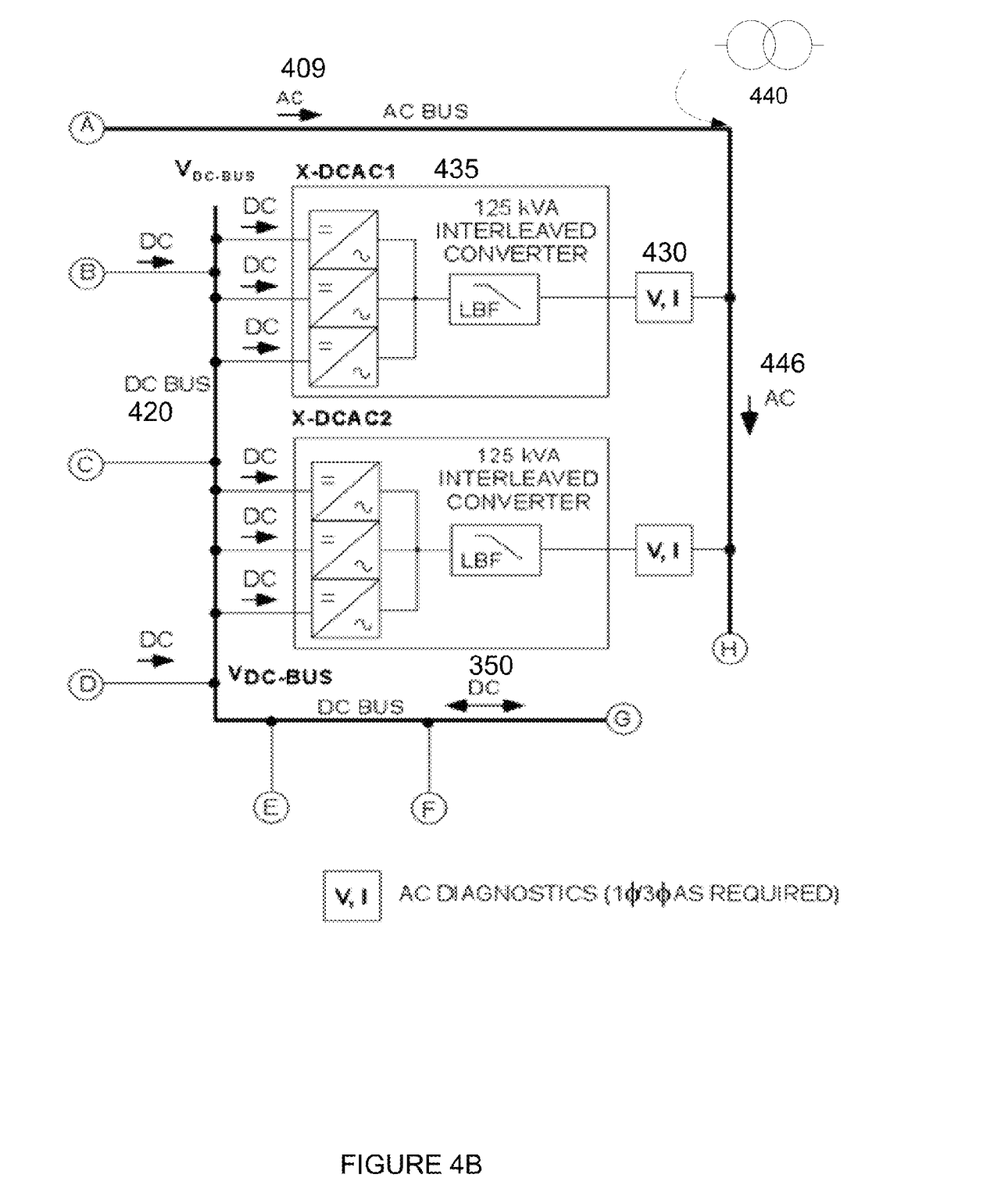
Figure 4C:
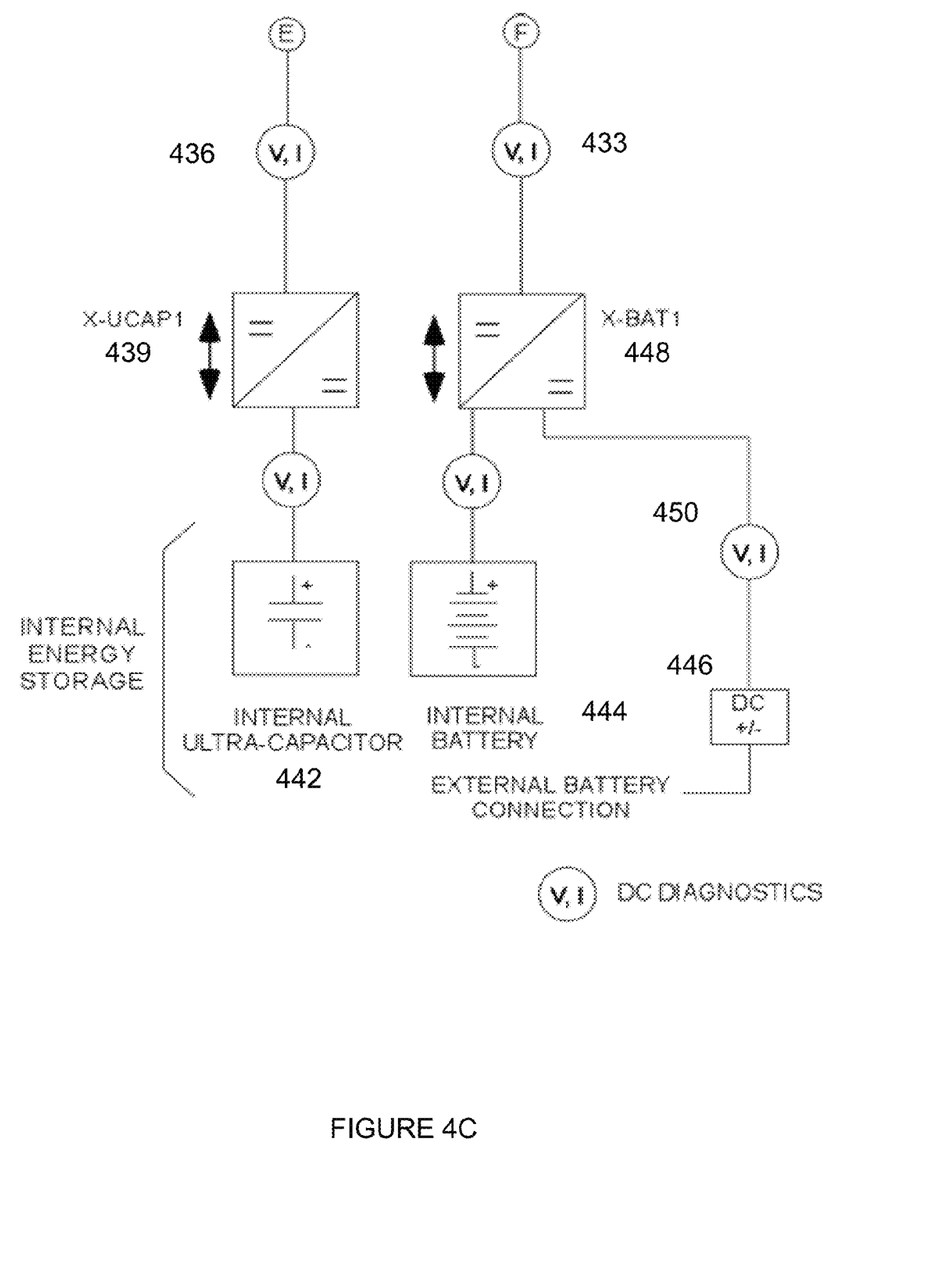
Figure 4D:
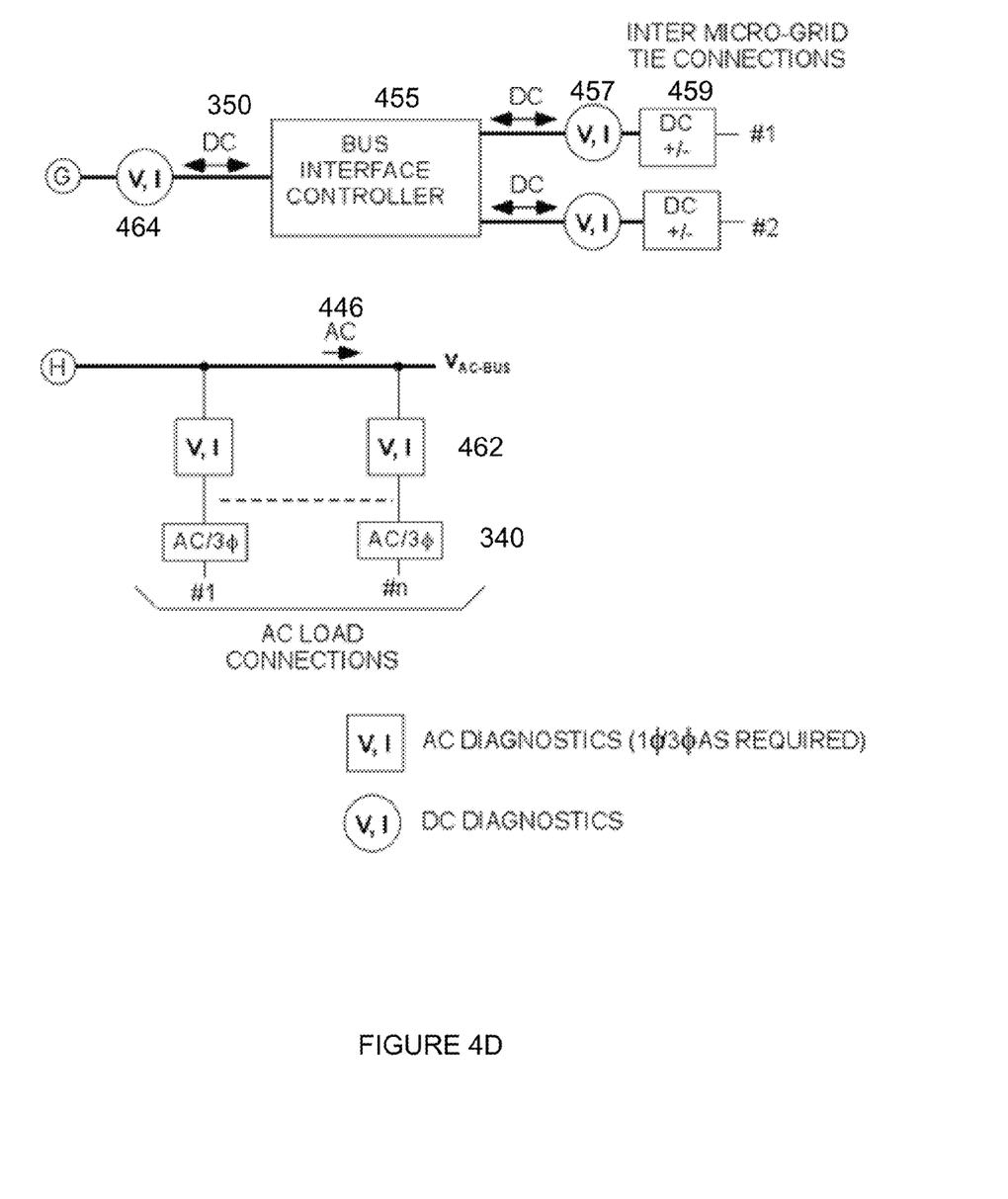

Referring to the exemplary illustration in FIG. 4B, one can see that connections A, B, C, and D from FIG. 4A have corresponding connection points A, B, C, and D in FIG. 4B. These connection points at A, B, C, and D do not represent physical elements of the microgrid module, but merely illustrate the connection points between FIGS. 4A and 4B. FIGS. 4C and 4D have a similar arrangement and FIGS. 4A-4D are intended to provide a more detailed illustration of the overview of the exemplary embodiment shown in FIG. 3.

In FIG. 4B, the DC input bus 420 has two primary connections. First, the DC input bus 420 can be coupled to a DC output bus 350 for supplying DC power from the microgrid module to a load or storage device. The DC input bus 420 and DC output bus 350 may be linked through a power converter (not shown in FIG. 4B) if needed to adjust the input and output voltages. While the embodiment described in connection with FIGS. 4A through 4D includes a DC input bus and a DC output bus, those of skill in the art will recognize that two distinct DC buses are not required. For example, other microgrid modules may comprise a single DC bus that receives DC power at one point and delivers DC power at another point.

Second, the DC input bus can feed one or more converters 435 implemented to convert DC power to AC power for distribution on the AC output bus 446. The AC output bus 446 is coupled to the AC grid input bus 409 and a transformer 440 can be placed between the AC grid input bus 409 and the AC output bus 446 if needed to adjust the input and output voltages. As illustrated in exemplary FIG. 4B, an AC diagnostic element 430 can be placed between converter 435 and the AC output bus 446. The AC diagnostic element 430 can comprise one or more sensors allowing the control software module 225 to monitor and control the operation of the physical circuit layer of the microgrid module.

FIG. 4B includes connection points E and F to the elements of FIG. 4C. Exemplary FIG. 4C shows additional components of the exemplary microgrid module including internal ultra-capacitor 442 and internal battery 444. In alternate embodiments, the internal energy storage components shown in FIG. 4C may not be internal parts of the microgrid module but may be external and coupled to the microgrid module. For example, as shown in FIG. 4C, the DC output bus 350 (not shown in FIG. 4C) may be coupled to an external battery via connection 446. The energy storage devices shown in FIG. 4C are coupled to the DC output bus 350 via converters 439 and 448. These converters function to convert the DC voltage level associated with the energy storage elements with the voltage level of the DC output bus 350. Specifically, the voltage level associated with each energy storage device may be substantially different from that of the DC bus. Moreover, the voltage levels associated with each energy storage device may vary substantially depending on the state-of-charge of the energy storage device. In general, as an energy storage device is charged, its associated voltage increases. Similarly, in general, as an energy storage device is discharged while delivering energy to the microgrid module, the associated voltage decreases. Power converters 439 and 448 can adjust voltage levels so that the voltage level of the DC output bus 350 and the energy storage devices is consistent.

The energy storage devices also are coupled to one or more DC diagnostic elements 436, 433 and 450. As with other diagnostic elements previously discussed, the DC diagnostic elements 436, 433 and 450 can comprise one or more sensors in communication with the control software module 225. The energy storage devices illustrated in FIG. 4C are merely representative and those of skill in the art will appreciate that other arrangements of energy storage devices can be placed either internal or external to the microgrid module and perform a similar function of storing energy provided by the microgrid module and subsequently providing it back to the microgrids as needed.

Referring to FIG. 4D, exemplary elements connected to points G and H from FIG. 4B are illustrated. Point G shows the connection of the DC output bus 350 to a bus interface controller 455. The bus interface controller 455 controls the flow of power between the microgrid module illustrated in FIGS. 4A-4D and one or more other microgrid modules. As described in further detail in the related patent applications filed concurrently with this application, multiple microgrid modules can be coupled and the bus interface controller (or power router) 455 manages the flow of power between the coupled microgrid modules. The power router 455 typically comprises control and power converter circuits that communicate with a controlling software module such as the power router software module 230 illustrated in FIG. 2. One or more microgrid tie connections 459 connect the DC output bus 350 to other microgrid modules. The DC output bus can also comprise one or more DC diagnostic elements 464 and 457 which can perform sensing functions as described previously.

FIG. 4D also illustrates exemplary elements connected to the AC output bus 446 at point H. One or more AC load connections 340 can be coupled to the AC output bus 446. The 3-phase AC load connection shown in FIG. 4D is merely exemplary and a variety of AC loads having different voltages and phase combinations can be connected to the AC output bus 446 of the microgrid module. The AC load connections can also comprise AC diagnostic elements similar to those described previously.

Figure 5:
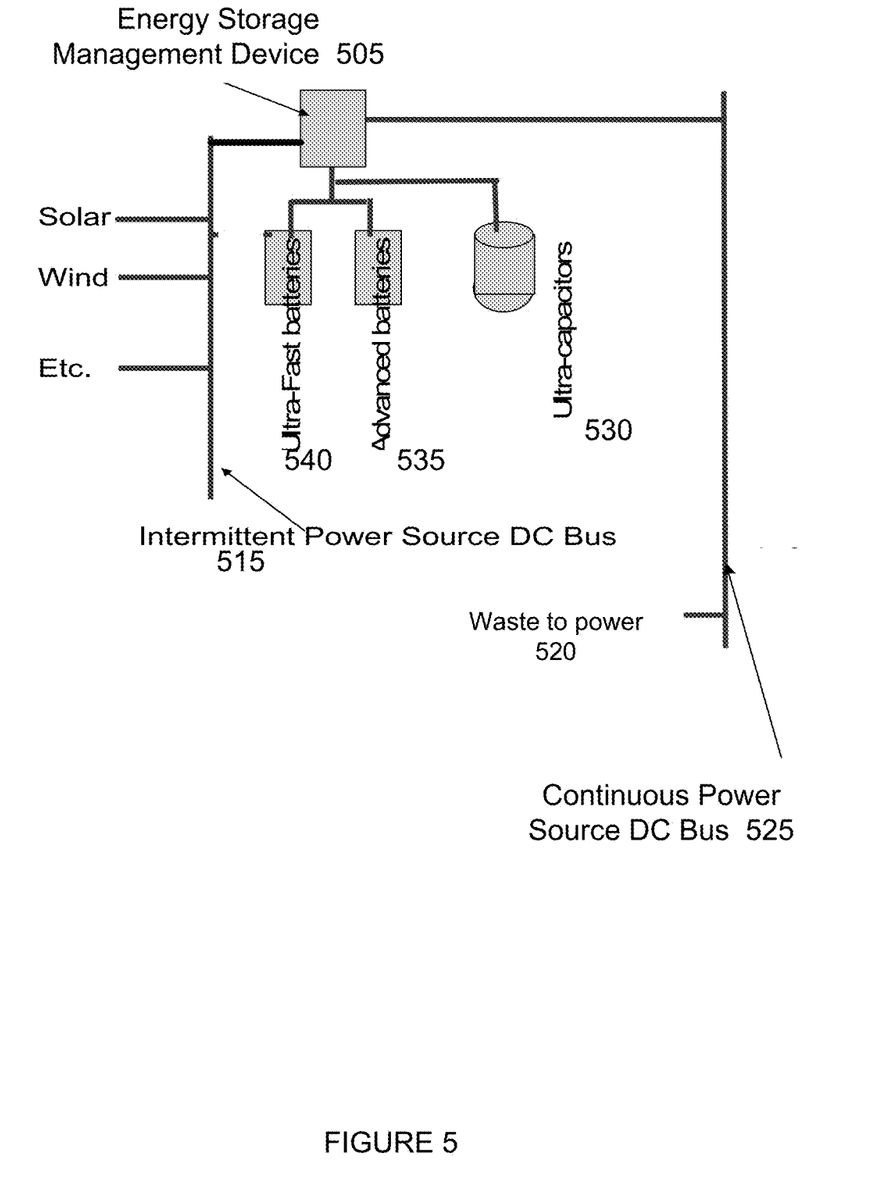
FIG. 5 is a diagram illustrating components that may be coupled to the physical circuit layer in accordance with an exemplary embodiment of the present invention.

Referring to FIG. 5, an alternate embodiment of the invention is illustrated. FIG. 5 illustrates an embodiment where intermittent and continuous power sources are managed separately. Intermittent power sources 510, such as solar and wind generated power, are coupled to an intermittent power source DC bus 515. Given the intermittent nature of power sources such as solar and wind, the intermittent power source DC bus 515 is coupled to an energy storage management device 505 that is capable of supplementing the power from the intermittent sources with energy stored in batteries 535 and 540 or ultra-capacitors 530. The energy storage management device 505 can detect interruptions in the power supplied from the intermittent sources and, upon detecting an interruption, the energy storage management device 505 can draw power from one or more of the storage devices.

A separate continuous power source DC bus 525 can supply power from more reliable sources such as power generated from burning waste 520. Although not shown in FIG. 5, power from the continuous power source DC bus 525 and the intermittent power source DC bus 515 supplies one or more DC input buses of a microgrid module. While the alternate embodiment illustrated in FIG. 5 is not required for operation of a microgrid module, this embodiment can be beneficial if such intermittent power sources are a significant source of the electrical power being processed through the microgrid module.

Figure 6:
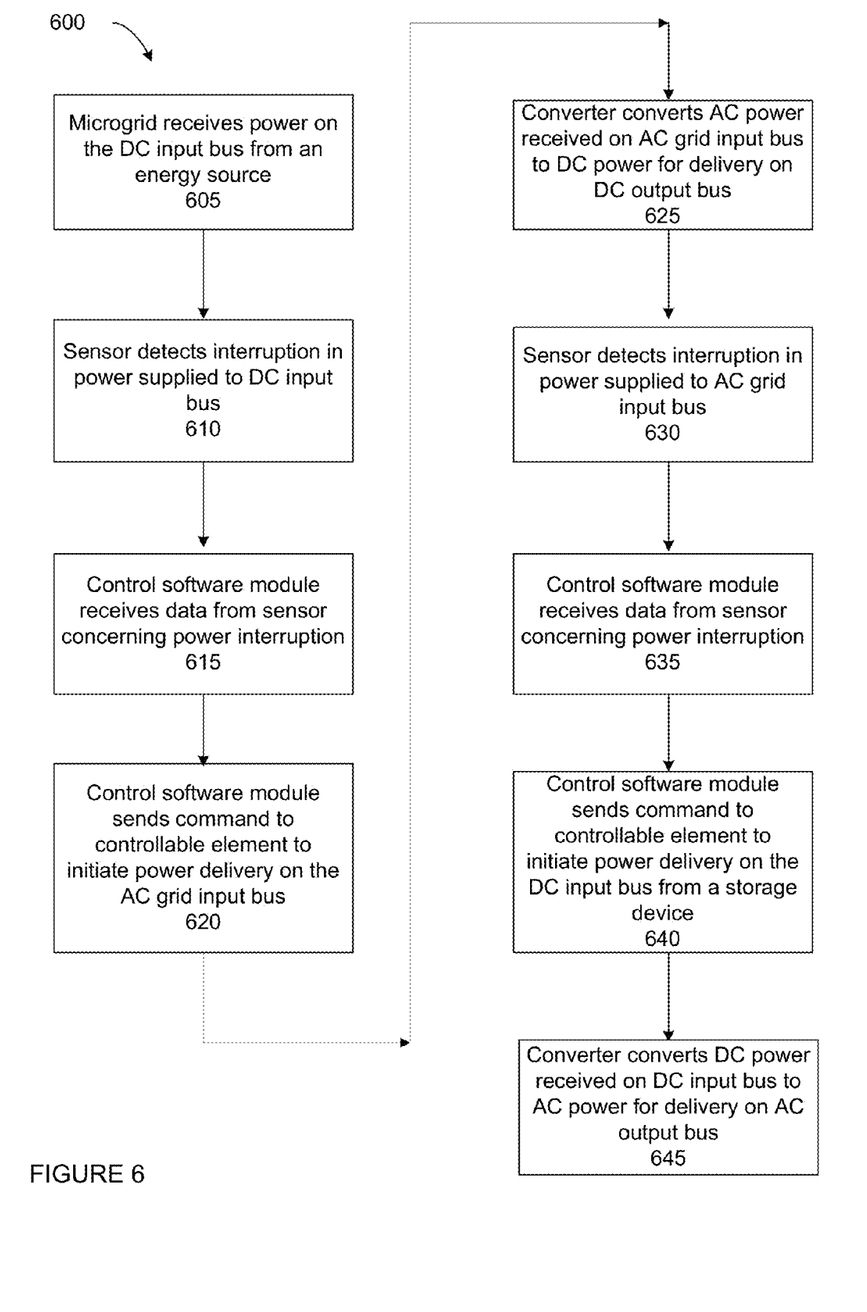
FIG. 6 is a flow chart diagram illustrating a process in accordance with an exemplary embodiment of the present invention.

Referring now to FIG. 6, an exemplary process 600 is illustrated for the operation of the microgrid module. Process 600 is merely one example of the operation of the preferred embodiment of the microgrid module and those of skill in the art will appreciate that the steps in exemplary process 600 can be modified and added to in accordance with the scope of the present invention. Beginning with step 605, the microgrid module can receive power from an energy source, such as the DERs illustrated in FIGS. 3 and 4A. In step 610, a sensor 417 detects an interruption in the power supplied to the DC input bus 420. For example, the DC power may be supplied by a source subject to interruptions such as power from a wind farm.

In step 615, the control software module 225 receives data from sensor 417 concerning the power interruption and applies the rules stored in memory at the microgrid computer 220 to determine the appropriate response. The control software module 225 can send a command to a controller to initiate power delivery on the AC grid input bus 409 in step 620. In step 625, the converter 411 coupled to the AC grid input bus 409 converts the AC power from the utility grid to DC power for delivery on the DC input bus 420 and then the DC output bus 350.

The microgrid module can continue to receive power from the utility grid until a sensor 407 detects an interruption in the power supplied by the AC grid input bus 409 in step 630. In step 635, the control software module 225 receives data from the sensor 407 concerning the power interruption and applies the rules stored in memory at the microgrid computing 220 so that a decision can be made in real time as to what power source the microgrid module should rely upon. In step 640, the control software module 225 sends a command to controller 433 to initiate power delivery on the DC output bus 350 from storage device 444. In step 645, power supplied by the storage device 444 can flow along the DC input bus 420 and be converted by converter 435 to AC power for delivery on the AC output bus 446.

The steps in exemplary process 600 are merely one example of the applications for the microgrid module. Those of skill in the art will appreciate that not all of the steps illustrated in process 600 are required in order to use the microgrid module. Furthermore, the steps of process 600 can be performed in other sequences and other steps can be added for other applications of the microgrid module.

In conclusion, the invention, as described in the foregoing exemplary embodiments, comprises a microgrid module that can receive either AC or DC power from a variety of power sources and supply either AC or DC power to a load or storage device. The microgrid module comprises a control software module that can respond quickly to changes in the power available to the microgrid and switch to alternate power supplies when needed. The control software module has access to rules stored locally on a microgrid computer. The rules determine what actions the control software module takes in response to changes in the power available to the microgrid.

The embodiments set forth herein are intended to be exemplary. From the description of the exemplary embodiments, equivalents of the elements shown herein and ways of constructing other embodiments of the invention will be apparent to practitioners of the art. For example, conventional electrical components can be added or modified within the microgrid but remain within the scope of the invention. Similarly, the methods described herein are merely exemplary and the control software module can be designed in a variety of ways to control the operation of the microgrid module. Many other modifications, features and embodiments of the invention will become evident to those of skill in the art. It should be appreciated, therefore, that many aspects of the invention were described above by way of example only and are not intended as required or essential elements of the invention unless explicitly stated otherwise. Accordingly, it should be understood that the foregoing relates only to certain embodiments of the invention and that numerous changes can be made therein without departing from the spirit and scope of the invention.

We claim:

1. A microgrid apparatus for controlling power supplied to and from the microgrid comprising:
    an AC grid input bus;
    an AC output bus coupled to the AC grid input bus, wherein the AC output bus provides output AC power from the microgrid apparatus;
    a first converter coupled to the AC grid input bus for converting AC power to DC power;
    a DC bus coupled to the first converter;
    a second converter coupled to the DC bus for converting DC power to AC power;
    a first controller for controlling the flow of power on the AC grid input bus;
    a second controller for controlling the flow of power on the DC bus; and
    a DC output bus coupled to the DC bus, wherein the DC output bus provides output DC power from the microgrid apparatus.

2. The microgrid apparatus of claim 1, further comprising a first transformer between the AC grid input bus and the AC output bus.

3. The microgrid apparatus of claim 1, further comprising a second transformational device coupled to the DC bus, the second transformational device adjusting the voltage on the DC bus.

4. The microgrid apparatus of claim 1, further comprising an energy storage device coupled to the DC bus.

5. The microgrid apparatus of claim 1, further comprising a bus interface controller for controlling the DC bus.

6. The microgrid apparatus of claim 1, further comprising a computer readable medium installed on a microgrid computer, the computer readable medium comprising a control software module for receiving data from at least one sensor in the microgrid and for sending commands to at least one of the first controller and the second controller.

7. The microgrid apparatus of claim 1, further comprising an energy storage management device coupled to the microgrid apparatus and coupled to an energy storage device, the energy storage management device controlling the flow of supplemental power from the energy storage device to the microgrid apparatus.

8. A method for controlling power supplied to and from a microgrid comprising:
    a first energy resource providing DC power to a microgrid via a DC bus;
    a first sensor coupled to the DC bus, the first sensor detecting an interruption in the DC power provided by the first energy resource to the microgrid;
    a control software module installed on a computing device coupled to the microgrid, the control software module receiving data from the first sensor associated with detecting an interruption in the DC power from the first energy resource;

the control software module sending a command to a first controller coupled to an AC grid input bus, the command to the first controller initiating the delivery of power to the microgrid via the AC grid input bus; and a converter coupled to the AC grid input bus converting the AC power to DC power for delivery via the DC bus to a load.

9. The method of claim 8, further comprising the step of a first transformational device transforming the DC power provided via the DC bus.

10. The method of claim 8, further comprising the step of a second transformer transforming the AC power provided via the AC grid input bus.

11. The method of claim 8, further comprising the step of the DC bus supplying power to a storage device coupled to the microgrid.

12. The method of claim 8, further comprising the steps of:
a second sensor coupled to the AC grid input bus, the second sensor detecting an interruption in the AC power supplied to the microgrid;
the control software module receiving data from the second sensor associated with detecting an interruption in the AC power;
the control software module sending a command to a second controller coupled to a storage device, the command to the second controller initiating the delivery of power to the DC bus for delivery to the load.

13. The method of claim 8, wherein the control software module accesses rules stored in a computer readable medium installed on the computing device, the rules determining the command the control software module sends to the first controller.

14. A method for controlling power supplied to and from a microgrid comprising:

a first energy resource providing DC power to a microgrid via a DC bus;
a first sensor coupled to the DC bus, the first sensor detecting an interruption in the DC power provided by the first energy resource to the microgrid;
a control software module installed on a computing device coupled to the microgrid, the control software module receiving data from the first sensor associated with detecting an interruption in the DC power from the first energy resource;
the control software module sending a command to a first controller coupled to an energy storage device, the energy storage device coupled to the microgrid, the command to the first controller initiating the delivery of power from the energy storage device to the microgrid via the DC bus; and
a converter coupled to the DC bus converting the DC power to AC power for delivery via an AC output bus to a load.

15. The method of claim 14, further comprising the step of a first transformational device transforming the DC power provided from the energy storage device to the DC bus.

16. The method of claim 14, wherein the control software module accesses rules stored in a computer readable medium installed on the computing device, the rules determining the command the control software module sends to the first controller.

17. The method of claim 14, wherein the first sensor is coupled to an energy storage management device.

18. The method of claim 14, wherein the first sensor is coupled to an energy storage management device, the energy storage management device drawing power from a second energy storage device to supplement the power provided by the first energy resource.

* * * * *